Feb. 2, 1932. A. BARÉNYI 1,843,265
PHOTOGRAPHIC SHUTTER
Filed April 22, 1931 3 Sheets-Sheet 1

Inventor:
Árpád Barényi
by
Franz Reinhold
Attorney.

Feb. 2, 1932.  A. BARÉNYI  1,843,265
PHOTOGRAPHIC SHUTTER
Filed April 22, 1931  3 Sheets-Sheet 2
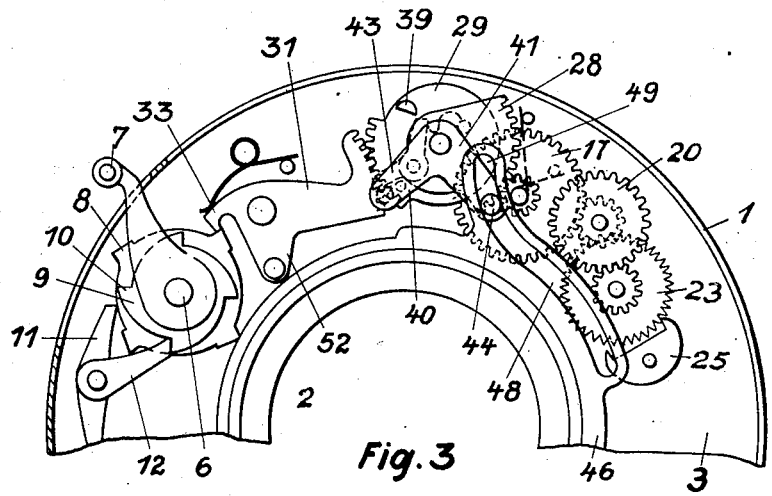
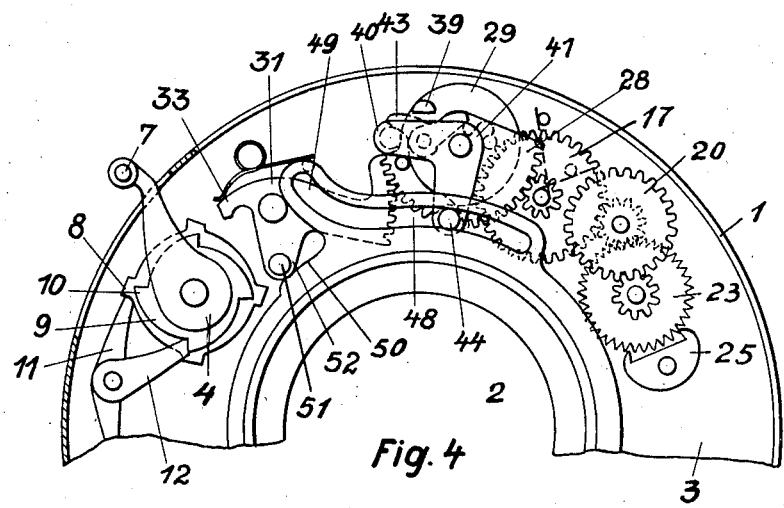
Inventor:
Árpád Barényi
by
Frank Reinhod.
Attorney Feb. 2, 1932. A. BARÉNYI 1,843,265
PHOTOGRAPHIC SHUTTER
Filed April 22, 1931  3 Sheets-Sheet 3
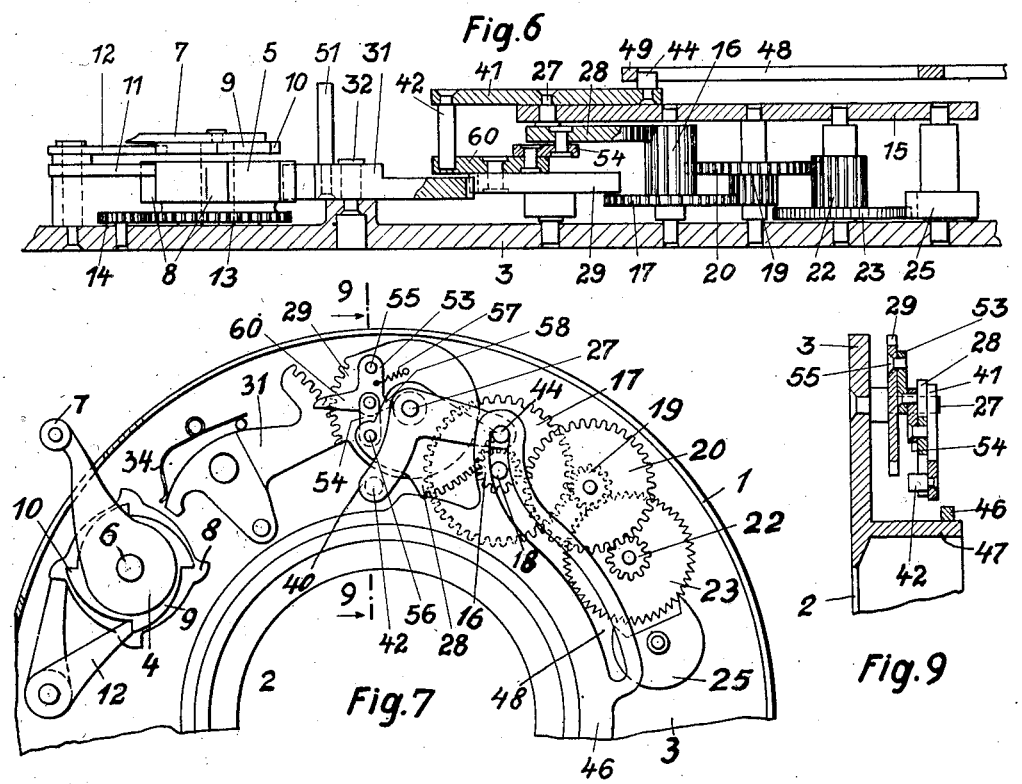
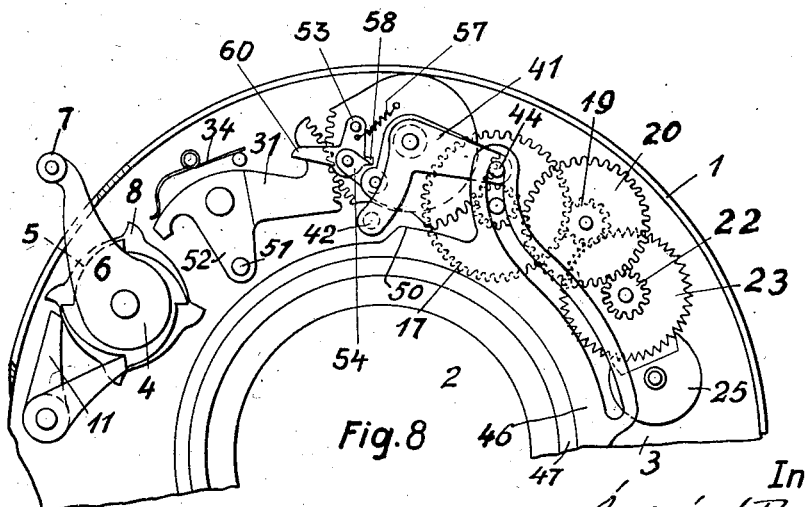
Inventor:
Árpád Barényi
by
Franz Reinhard.
Attorney.

Patented Feb. 2, 1932

1,843,265

UNITED STATES PATENT OFFICE

ÁRPÁD BARÉNYI, OF BERLIN-LICHTERFELDE, GERMANY

PHOTOGRAPHIC SHUTTER

Application filed April 22, 1931, Serial No. 531,943, and in Germany May 20, 1930.

My invention relates to improvements in photographic shutters, and more particularly in the type of pivoted blade, symmetrical opening shutter comprising a blade mechanism and a spring driven motor or master member which when set and released rotates the blades in the same direction for opening and closing the shutter. More particularly my invention relates to mechanism connected with the motor or master member for controlling the opening and closing movements of the blades, and the object of the improvements is to provide a controlling mechanism in which the retarding power exerted by the said mechanism on the motor or master member is constant while it acts on the said motor or master member, and in which the interengaging surfaces of the motor or master member and the controlling mechanism are not subject to wear. With this object in view my invention consists in connecting the controlling mechanism with the motor or master member by means of a coupling member adapted to be operated after the desired period of time for throwing the controlling mechanism out of operation.

Figure 5:
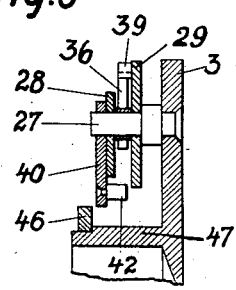

For the purpose of explaining the invention two examples embodying the same have been shown in the accompanying drawings, in which the same reference characters have been used in all the views to indicate corresponding parts. In said drawings, Fig. 1 is a fragmentary sectional elevation showing the motor or master member and the controlling or retarding mechanism associated therewith, the shutter blades and their operating mechanism being omitted, and the motor or master member and the parts of the controlling mechanism being in the positions prior to the beginning of the operation of the shutter mechanism, and the parts of the controlling mechanism being in the positions corresponding to a long opening of the shutter, Fig. 2 is a similar sectional elevation showing the parts of the controlling mechanism in the positions corresponding to a reduced time of exposure, Fig. 3 is a similar sectional elevation showing the parts of the controlling mechanism disconnected from the motor or master member, Fig. 4 is a similar sectional elevation showing the parts of the controlling mechanism in the positions corresponding to the shortest exposure, Fig. 5 is a sectional elevation taken on the line 5—5 of Fig. 1, Fig. 6 is a sectional plan view taken substantially on the line 6—6 of Fig. 1.

Figure 1:
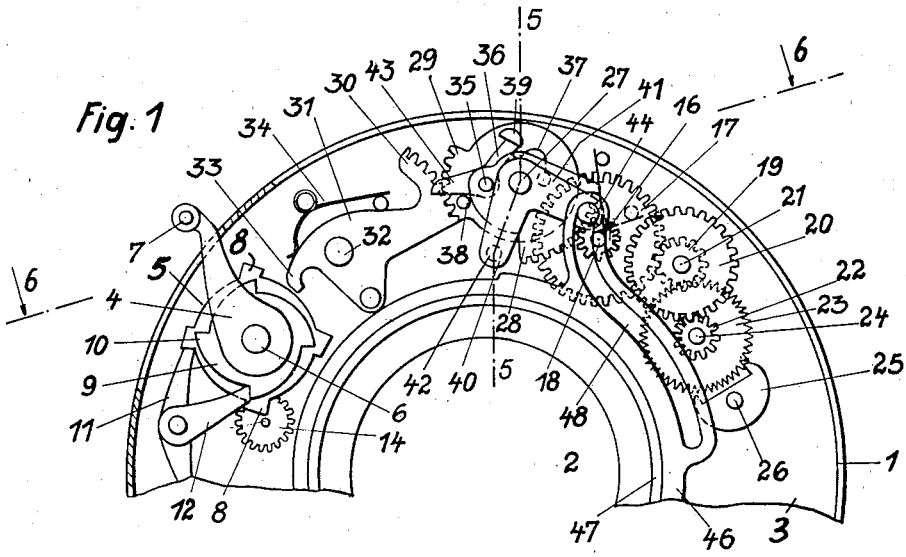
Figure 2:
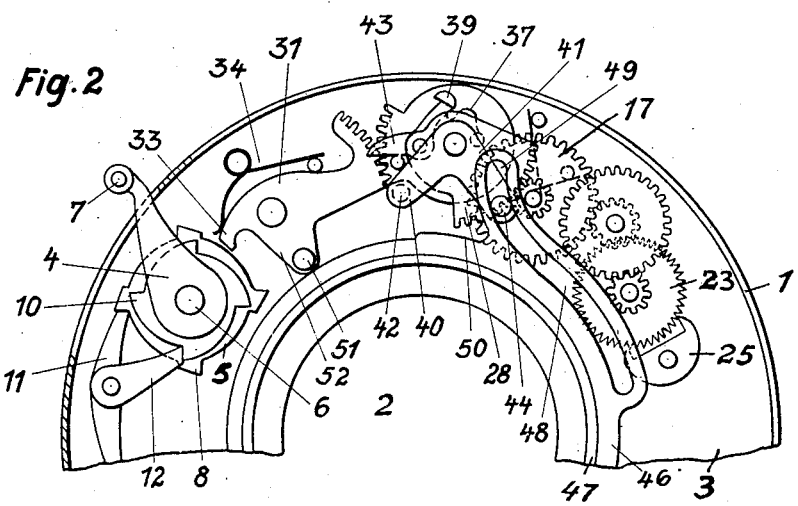

Fig. 7 is a fragmentary elevation similar to the one illustrated in Fig. 1 and the parts of the controlling mechanism in similar positions, the said figure showing a modification of the coupling means, Fig. 8 is a similar elevation showing the coupling means in the position after disconnecting the controlling mechanism from the motor or master member, and Fig. 9 is a sectional elevation taken on the line 9—9 of Fig. 7.

In the example shown in Figs. 1 to 6 the shutter comprises the usual annular casing 1 having a central exposure or lens opening 2 normally closed by blades (not shown). Upon a partition member 3 most of the shutter operating mechanism including a motor or master member 4 and the retarding mechanism thereof is carried. The motor or master member comprises a housing 5 having a spiral spring confined therein, which spring is connected with one end to the housing and with its opposite end to an arbor 6 carrying a setting lever 7. The said housing is formed with lugs 8, and the setting lever is connected with a disk 9 formed with teeth 10. The said lugs and teeth are engaged respectively by latches 11 and 12 connected with the operating mechanism. The housing 5 is formed with gear teeth 13 engaging in a pinion 14 connected with the shutter operating mechanism (not shown). As is known to those skilled in the art by rocking the setting lever 7 in anti-clockwise direction the spring is put under tension, whereupon the disk 9 and the arbor 6 are locked in position by the latch 12. Thereafter the housing likewise tends to turn in anti-clockwise direction, but for the present it is locked in position by the latch 11 engaging one of the lugs 8. When the latch 11 is retracted from the said lug by the operating mechanism the housing rotates in anti-clockwise direction and such rotary movement is transmitted by means of the gear teeth 13 and the pinion 14 to the shutter operating mechanism. The motor or master member and its operation are known in the art, and I deem it not necessary to describe the same more in detail. But for a detailed description reference is made to my Patent No. 1,828,215, granted October 20, 1931.

Referring now to those parts of the mechanism to which my invention more particularly relates, on the partition member 3 and a plate 15 connected therewith a retarding mechanism is mounted which comprises a pinion 16 connected with a gear wheel 17 and rotatably mounted therewith on a bolt 18, a pinion 19 meshing with the gear wheel 17 and a gear wheel 20 connected therewith and both mounted on a bolt 21, a pinion 22 meshing with the gear wheel 20 and connected with a star wheel 23 and both mounted on a bolt 24, and a pallet 25 engaging in the teeth of said star wheel and mounted on a bolt 26.

On a bolt 27 a toothed sector 28 is rockingly mounted, which is in mesh with the pinion 16, and on the same bolt a second toothed sector 29 is rockingly mounted, which is in engagement with teeth 30 formed on a lever 31 rockingly mounted on a pivot bolt 32 rising from the partition member 3. The said lever is formed with a heel 33 located in position for engagement with the lugs 8 of the housing 5, and a spring 34 acting on the lever 31 tends to rock the same in anti-clockwise direction and into the position shown in Fig. 1. On a pivot bolt 35 secured to the toothed sector 28 a latch 36 is rockingly mounted, which is acted upon by a leaf spring 37 carried by the sector 28 and tending to rock the latch 36 in anti-clockwise direction and with an arm 43 into engagement with a pin 38 secured to the sector 29. To the said sector 29 a lug 39 is secured which is normally engaged by the latch 36.

On the bolt 27 a bell crank lever 40, 41 is rockingly mounted the arm 40 of which carries a pin 42 located in the path of the arm 43. To the arm 41 of the said bell crank lever a pin 44 is fixed which is engaged by a cam slot 48, 49 formed in an annular disk 46 rockingly mounted on a flange 47 of the partition member 3, the said cam slot comprising a concentric portion 48 and an outwardly directed portion 49. The annular disk 46 is formed with a cam 50 projecting from the annular portion thereof and adapted for engagement with a pin 51 fixed to an extension 52 of the lever 31.

The annular disk 46 is adapted to be rocked on the flange 47 in circumferential direction for rocking the bell crank lever 40, 41 and setting the pin 42 thereof in different positions circumferentially of the sectors 28 and 29 and different distances away from the arm 43 of the latch 36.

The operation of the mechanism is as follows:

As shown in Fig. 1 the parts of the retarding mechanism are set into position for making a long exposure, the annular disk 46 being rocked to the right, and the pin 42 being far away from the arm 43 of the latch 36. If now the motor or master member 4 has been set by the setting lever 7 and released by the operating mechanism, the housing is at first rapidly rotated in anti-clockwise direction until one of its lugs 8 impinges upon the heel 33 of the lever 31. Thereafter the movement of the housing is retarded, because its rotary movement is transmitted to the retarding mechanism, the rotary movement of the sector 29 being transmitted by the latch 36 to the sector 28 and the gearing connected therewith. When the arm 43 impinges upon the pin 42 the latch 36 is rocked in clockwise direction and out of locking engagement with the lug 39, so that the retarding mechanism is disconnected from the sector 29, the lever 31 and the motor or master member, which now rapidly completes its rotary movement for closing the shutter.

If a shorter exposure is desired the annular disk 46 is rocked into the position shown in Fig. 2 in which the distance between the pin 42 and the arm 43 is reduced. Therefore, after starting the rotary movement of the housing 5 and the shutter operating mechanism the arm 43 impinges upon the pin 42 after a shorter period of time, so that the rapid closing movement of the shutter operating mechanism begins at an earlier movement. Fig. 3 shows the parts in the position in which the retarding mechanism has been disconnected from the motor or master member.

When further rocking the annular disk 46 in anti-clockwise direction the pin 44 is engaged by the concentric portion 48, and the pin 42 is set into the position in which the latch 36 is rocked out of engagement with the lug 39 immediately after the lug 8 has engaged and rocked the lever 31, so that the time of the exposure is further reduced.

For further reducing the time of the exposure the annular disk 46 is rocked into the position shown in Fig. 4 in which the pin 42 engages the concentric portion 48 of the cam slot 48, 49 and the cam 50 engages the pin 51 thus rocking the lever 31 with its heel 33 out of position for engagement with the lugs 8. Now the rotary movement of the spring housing is unimpeded, and the time of the exposure of the shutter is reduced to its minimum.

In all the positions of the mechanism except the one described with reference to Fig.

4 the lever 31 is rocked through the same angle, and the position of its heel 33 relatively to the lugs 8 is always the same. Therefore the said lugs and the heel 33 engage each other always with their full contacting surfaces, so that the wear of the contacting surfaces is reduced to a minimum.

In Figs. 7 to 9 the construction of the motor or master member 4, the retarding mechanism and the lever 31 for transmitting the rotary movement of the spring housing to the retarding mechanism is the same as has been described with reference to Figs. 1 to 6, and the same letters of reference have been used to indicate corresponding parts. But the connection between the toothed sectors 28 and 29 is made in a different way. For connecting the said parts a toggle joint is provided which comprises two jointed links 53 and 54 jointed respectively to pins 55 and 56 secured to the said toothed sectors. To the link 53 a spring 57 is connected which tends to hold the toggle joint with its links in stretched position and with a heel 58 formed on the link 53 in engagement with the hub of the toothed sector 28. The said link 53 is made integral with a heel 60 adapted for engagement with the pin 42.

Normally the coupling means connecting the sectors 28 and 29 are in the position shown in Fig. 7 in which the links 53, 54 are held in stretched position by the spring 57. When the shutter mechanism is operated the sector 29 and the retarding mechanism are operated in the manner described above until the heel 60 impinges upon the pin 42 whereupon the toggle joint is moved into the position shown in Fig. 8. Now the sector 29 continues its rotary movement, but such rotary movement is not transmitted to the sector 28 and the retarding mechanism.

I claim:

1. In a shutter for photographic cameras, the combination, with the shutter operating mechanism, of retarding mechanism, a member in position for being acted upon by said operating mechanism for transmitting movement therefrom to said retarding mechanism, means for operatively connecting said member and retarding mechanism, and a device operative in the course of the operation of the retarding mechanism for rendering said connecting means inoperative.

2. In a shutter for photographic cameras, the combination, with the shutter operating mechanism, of retarding mechanism, a member in position for being acted upon by said operating mechanism for transmitting movement therefrom to said retarding mechanism, means for operatively connecting said member and retarding mechanism, a device operative in the course of the operation of the retarding means for rendering said connecting means inoperative, and means for setting said device in positions for being operative after different periods of time of the operation of said retarding mechanism.

3. In a shutter for photographic cameras, the combination, with the shutter operating mechanism, an operating member in position for being acted upon by said operating mechanism, a member in driving engagement with said operating member and carrying a lug, a toothed member in driving engagement with said retarding mechanism, a latch mounted on said toothed member and adapted for engagement with said lug, an abutment member mounted coaxially of said toothed member and in position for throwing said latch out of operative engagement with said lug, and means for setting said abutment member in different positions relatively to said latch.

4. In a shutter for photographic objectives, the combination, with the operating mechanism, of retarding mechanism, an operating member in position for being actuated by said operating mechanism, a toggle joint connecting said operating member and retarding mechanism and adapted when stretched to transmit rotary movement from said operating member to said retarding mechanism, and means operative in the course of the operation of said retarding mechanism for rocking said toggle joint out of stretched position.

5. In a shutter for photographic objectives, the combination, with the operating mechanism, of retarding mechanism, an operating member in position for being actuated by said operating mechanism, a toggle joint connecting said operating member and retarding mechanism and adapted when stretched to transmit rotary movement from said operating member to said retarding mechanism, one of the links of said toggle joint being formed with a heel, and a stop member located in position for being impinged upon by said heel in the course of the operation of said retarding mechanism for rocking said toggle joint out of stretched position.

6. In a shutter for photographic cameras, the combination, with the shutter operating mechanism, of retarding mechanism, a member in position for being acted upon by said operating mechanism for transmitting movement therefrom to said retarding mechanism, means for operatively connecting said member and retarding mechanism, a stop member in position for engaging said connecting means and throwing the same out of operative position in the course of the operation of the said retarding mechanism, and a cam member rockingly mounted coaxially of the shutter for setting said stop member in different positions relatively to said connecting means.

7. In a shutter for photographic cameras, the combination, with the shutter operating mechanism, of retarding mechanism, a member in position for being acted upon by said operating mechanism for transmitting movement therefrom to said retarding mechanism, means for operatively connecting said member and retarding mechanism, a stop member in position for engaging said connecting means and throwing the same out of operative position in the course of the operation of the said retarding mechanism, and means for moving said member out of position for being acted upon by said operating mechanism.

8. In a shutter for photographic cameras, the combination, with the shutter operating mechanism, of retarding mechanism, a member in position for being acted upon by said operating mechanism for transmitting movement therefrom to said retarding mechanism, means for operatively connecting said member and retarding mechanism, a stop member in position for engaging said connecting means and throwing the same out of operative position in the course of the operation of the said retarding mechanism, and a cam member rockingly mounted coaxially of the shutter for setting said stop member in different positions relatively to said connecting means, said cam member being formed with a cam located in position for throwing said operating member out of position for being acted upon by said operating mechanism.

In testimony whereof I hereunto affix my signature.

ÁRPÁD BARÉNYI.